(12) United States Patent
Estrada

(10) Patent No.: US 7,542,520 B1
(45) Date of Patent: Jun. 2, 2009

(54) APPARATUS AND METHOD FOR IMPLEMENTING A LOW COMPLEXITY DIGITAL MODULATOR

(75) Inventor: Andrew Xavier Estrada, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 09/452,933

(22) Filed: Dec. 2, 1999

(51) Int. Cl.
*H03C 3/00* (2006.01)
*H03K 7/06* (2006.01)
*H04L 27/12* (2006.01)

(52) U.S. Cl. ...................... 375/303; 332/100
(58) Field of Classification Search ........... 375/303, 375/324, 272, 295, 274; 310/309; 332/100, 332/101; 359/158; 341/147; 370/291
See application file for complete search history.

(56) References Cited

U.S. PATENT DOCUMENTS

| | | | |
|---|---|---|---|
| 5,090,026 A * | 2/1992 | Stern et al. | 375/274 |
| 5,237,324 A * | 8/1993 | Linz et al. | 310/309 |
| 5,418,778 A * | 5/1995 | Cummiskey et al. | 370/291 |
| 5,555,119 A * | 9/1996 | Lewis | 359/158 |
| 6,025,758 A * | 2/2000 | Lu | 332/100 |
| 6,175,599 B1 * | 1/2001 | Lyon et al. | 375/261 |
| 6,366,622 B1 | 4/2002 | Brown et al. | |

FOREIGN PATENT DOCUMENTS

| | | |
|---|---|---|
| EP | 0494696 | 7/1992 |
| EP | 0531100 | 3/1993 |
| GB | 2335122 | 9/1999 |

OTHER PUBLICATIONS

International Search Report—PCT/US00/042435, International Search Authority European Patent Office, Oct. 5, 2001.

* cited by examiner

*Primary Examiner*—Curtis B. Odom
(74) *Attorney, Agent, or Firm*—Kenneth K. Vu

(57) ABSTRACT

A low complexity digital modulator, which is particularly useful for providing Gaussian frequency shift keying (GFSK) modulation, includes a filter, an integrator and a look-up table (LUT) stage. The filter is configured to receive a series of impulses and to generate a predetermined and fixed sequence of instantaneous frequency samples in response to each received impulse. The generated instantaneous frequency samples represent a predetermined type of filtering, such as Gaussian filtering, of the series of impulses. The integrator is configured to receive and integrate the instantaneous frequency samples to generate a sequence of phase samples. The LUT stage is configured to receive the phase samples and to generate sine and cosine samples of a complex baseband signal in response to each phase sample. The LUT stage stores only one quadrant of cosine samples and calculates the other cosine samples and all of the sine samples from the stored cosine samples. A controller generates and provides the series of impulses to the modulator. Transmitter digital-to-analog converters convert the sine and cosine samples of the complex baseband signal to analog form prior to transmission.

53 Claims, 10 Drawing Sheets

| GAUSSIAN FILTER 28 DIGITAL INPUT | | GAUSSIAN FILTER 28 OUTPUT SEQUENCE OF FREQUENCY SAMPLES FRQ[2:0] FOR PRODUCING GAUSSIAN PULSE SHAPE (Decimal/Binary 2's Complement Integers) | | | | | | | |
|---|---|---|---|---|---|---|---|---|---|
| PREVBIT | TXBITS | FRQ$_1$[2:0] (Decimal/ Binary) | FRQ$_2$[2:0] (Decimal/ Binary) | FRQ$_3$[2:0] (Decimal/ Binary) | FRQ$_4$[2:0] (Decimal/ Binary) | FRQ$_5$[2:0] (Decimal/ Binary) | FRQ$_6$[2:0] (Decimal/ Binary) | FRQ$_7$[2:0] (Decimal/ Binary) | FRQ$_8$[2:0] (Decimal/ Binary) |
| 0 | 0 | -2/ 110 | -2/ 110 | -2/ 110 | -2/ 110 | -2/ 110 | -2/ 110 | -2/ 110 | -2/ 110 |
| 0 | 1 | -2/ 110 | -1/ 111 | -1/ 111 | 0/ 000 | +1/ 001 | +1/ 001 | +2/ 010 | +2/ 010 |
| 1 | 0 | +2/ 010 | +1/ 001 | +1/ 001 | 0/ 000 | -1/ 111 | -1/ 111 | -2/ 110 | -2/ 110 |
| 1 | 1 | +2/ 010 | +2/ 010 | +2/ 010 | +2/ 010 | +2/ 010 | +2/ 010 | +2/ 010 | +2/ 010 |

FIG. 4

APPARATUS AND METHOD FOR IMPLEMENTING A LOW COMPLEXITY DIGITAL MODULATOR

BACKGROUND OF THE INVENTION

1. Field of the Invention

The present invention relates to digital modulation apparatus and techniques, and more particularly, to frequency-shift keying (FSK) digital modulation.

2. Description of the Related Art

Digital modulation is the process of preparing digital data signals for transmission, such as transmission in wireless communications. For long distance transmission of carrier signals, the digital data is typically used to modulate the carrier signal before transmission. The result is referred to as amplitude-shift keying (ASK), phase-shift keying (PSK), or frequency-shift keying (FSK) modulation if the amplitude, phase, or frequency, respectively, of the carrier signal is modulated in accordance with the digital data.

With respect to FSK modulation, the digital data signals shift the output frequency of the carrier between predetermined values, making FSK a form of frequency modulation. A binary 0 is typically represented by a first frequency $f_0$, and a binary 1 is typically represented by a second frequency $f_1$. The peak frequency deviation $\Delta f$ is generally equal to $(f_1-f_0)/2$, and the modulation index h is equal to $\Delta f/R$, where R is equal to the symbol rate $1/T$. The variable T represents the bit interval of the input digital data (or message) signal.

If the digital signals input to the modulator assume one of only two possible values, the communication system is referred to as binary. For example, binary PSK modulation is referred to as BPSK. If one of M>2 possible values is available the system is referred to as M-ary. An important M-ary modulation scheme, quadriphase-shift keying (QPSK), is often employed in situations in which bandwidth efficiency is a consideration. Systems having M>4 are often referred to as multilevel, e.g., multilevel FSK (MFSK) and multilevel PSK (MPSK).

A digital system is referred to as being "coherent" if a local reference is available for demodulation, where the local reference is in phase with the transmitted carrier. Otherwise, the system is referred to as being "noncoherent". While the performance characteristics of coherent systems are generally better than noncoherent systems, noncoherent systems have the advantage of simplicity of implementation.

Conventional analog FSK modulators typically attempt to directly modulate the voltage controlled oscillator (VCO) component contained in an analog phase locked loop (PLL). Although this technique has the advantage that the modulated carrier is generated with a single device, the technique has several inherent problems. Specifically, the frequency deviation and zero-crossing aspects of the waveform are difficult to control because of the behavior of the PLL. This is because the digital data going into the VCO appears to be a disturbance or phase error and the PLL tries to correct it to obtain a pure carrier. Furthermore, random digital data often results in a frequency offset. Some conventional designs attempt to bypass the PLL by opening the loop during modulation, but this technique introduces problems with excessive pulling and carrier frequency drift.

Direct digital synthesis (DDS) devices overcome many of the performance disadvantages associated with the prior art analog modulators. Specifically, DDS devices are capable of digitally creating sine waves. In addition, DDS devices are typically capable of implementing several types of modulation schemes. DDS designs allow designers to control an output sine wave's frequency and phase to extremely high resolution. Disadvantageously, the DDS devices of the prior art are typically complex and have significant power and cost requirements. Conventional DDS devices typically include frequency registers for use in implementing FSK, phase registers for use in implementing PSK and QPSK, a digital phase accumulator, multiplexers for interconnecting the registers and the digital phase accumulator, a sine wave ROM look-up table (LUT), and a digital-to-analog converter (DAC). The inclusion of frequency registers, phase registers, and multiplexers cause conventional DDS devices to be relatively complex circuits typically requiring a significant amount of precious integrated circuit (IC) silicon area. Furthermore, conventional sine wave LUTs typically requires relatively large ROMs. All of these factors cause conventional DDS design approaches to produce relatively complex, large and expensive modulators.

A digital modulation technique that is currently being used in wireless communication systems is Gaussian filtered FSK (GFSK). In accordance with this technique, the digital baseband signal is processed by a premodulation Gaussian shaping filter. Specifically, the digital data waveform (with rectangular binary 1 and binary 0 pulses) is first filtered by a low-pass filter having a Gaussian-shaped frequency response. This Gaussian filtered data waveform is then input to the frequency modulator to generate a GFSK signal.

One advantage of GFSK as compared to FSK modulation techniques is that the rectangular input pulses used in FSK modulation result in piecewise linear phase changes which tend to widen the output spectrum. Smoothing these phase changes, however, using a filter having a Gaussian impulse response circumvents this problem. The Gaussian-shaped impulse response filter generates a signal having lower side lobes and a narrower 20 dB bandwidth than a rectangular pulse. Such filtering removes the higher frequency components in the digital data waveform and, therefore, yields a more compact spectrum. Other advantages of GFSK modulation include: the narrow power spectrum with a narrow main lobe and low spectral tails maintain the adjacent channel interference at low levels and thereby achieve increased spectral efficiency; GFSK can be demodulated using noncoherent systems which results in low cost GFSK receivers; and GFSK maintains a constant envelope waveform.

The key parameter of GFSK modulation in controlling both bandwidth and intersymbol interference (ISI) is the 3 dB down filter-bandwidth B multiplied by the bit interval T (commonly referred to as the "BT product"). The BT product is known as the normalized bandwidth. When BT<1, the frequency shaping pulse has a duration that is greater than T causing ISI to be introduced. As BT decreases, the induced ISI is increased. Thus, whereas a smaller value of BT results in a more compact power density spectrum, the induced ISI will degrade the bit-error-rate (BER) performance. Hence, there are tradeoffs in the selection of the BT product.

An example of one wireless communication standard that requires GFSK modulation is the so-called "Bluetooth" standard. Bluetooth requires that data be transmitted at a symbol rate of 1 Msps (Megasymbols per second). A Gaussian-shaped, binary FSK modulation is applied with a BT product of 0.5. A binary one is represented by a positive frequency deviation. A binary zero is represented by a negative frequency deviation. The modulation index is specified to be 0.28-0.35, and the maximum frequency deviation is specified to be between 140 kHz and 175 kHz.

One conventional means for implementing a fully digital GFSK modulator is accomplished by combining a digital Gaussian filter with a DDS device. Such devices, however, suffer from the disadvantages of being relatively complex, large, power consuming and expensive devices. This is due not only to the complexity of the DDS devices as described above, but also to the complexity of conventional digital filters. Specifically, digital filters typically perform one or more mathematical functions on an input digital data stream. Digital filtering involves a computational process or algorithm by which a sampled input signal or sequence of input numbers is transformed into a second sequence of output numbers. The computational process typically involves the summation of scaled samples of the input signal. Characteristics of the digital filters can be altered under software control, which adds to their overall flexibility. As such, conventional digital filters typically include several adders, multipliers, and accumulators. The inclusion of these components increases the complexity, size and cost of the digital filters.

The size and power requirements for wireless communication devices continues to decrease as more and more of the components of such devices are implemented in digital circuitry. Therefore, a need exists for a relatively small, simple, accurate and power conserving fully digital GFSK modulator design that overcomes the disadvantages of the prior art conventional GFSK devices.

SUMMARY OF THE INVENTION

The present invention comprises an apparatus including a modulator. The modulator preferably includes a filter, an integrator and a look-up table (LUT) stage. The filter is configured to receive a series of impulses and to generate a predetermined and fixed sequence of instantaneous frequency samples in response to each received impulse. The generated instantaneous frequency samples represent a predetermined type of filtering of the series of impulses. The integrator is configured to receive and integrate the instantaneous frequency samples to generate a sequence of phase samples. The LUT stage is configured to receive the phase samples and to generate samples of a complex baseband signal in response to each phase sample.

The present invention also provides a method of performing digital communications. The method includes: receiving a series of impulses; establishing at least two different predetermined and fixed sequences of instantaneous frequency samples representative of a predetermined type of filtering of the series of impulses; generating one of the predetermined and fixed sequences of instantaneous frequency samples in response to each received impulse; integrating the generated instantaneous frequency samples to generate a sequence of phase samples; and generating samples of a complex baseband signal in response to each generated phase sample.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

FIG. 4 is a table illustrating predetermined sequences of instantaneous frequency samples generated in accordance with the present invention by the filter shown in FIG. 2.

DETAILED DESCRIPTION OF THE INVENTION

Figure 1:
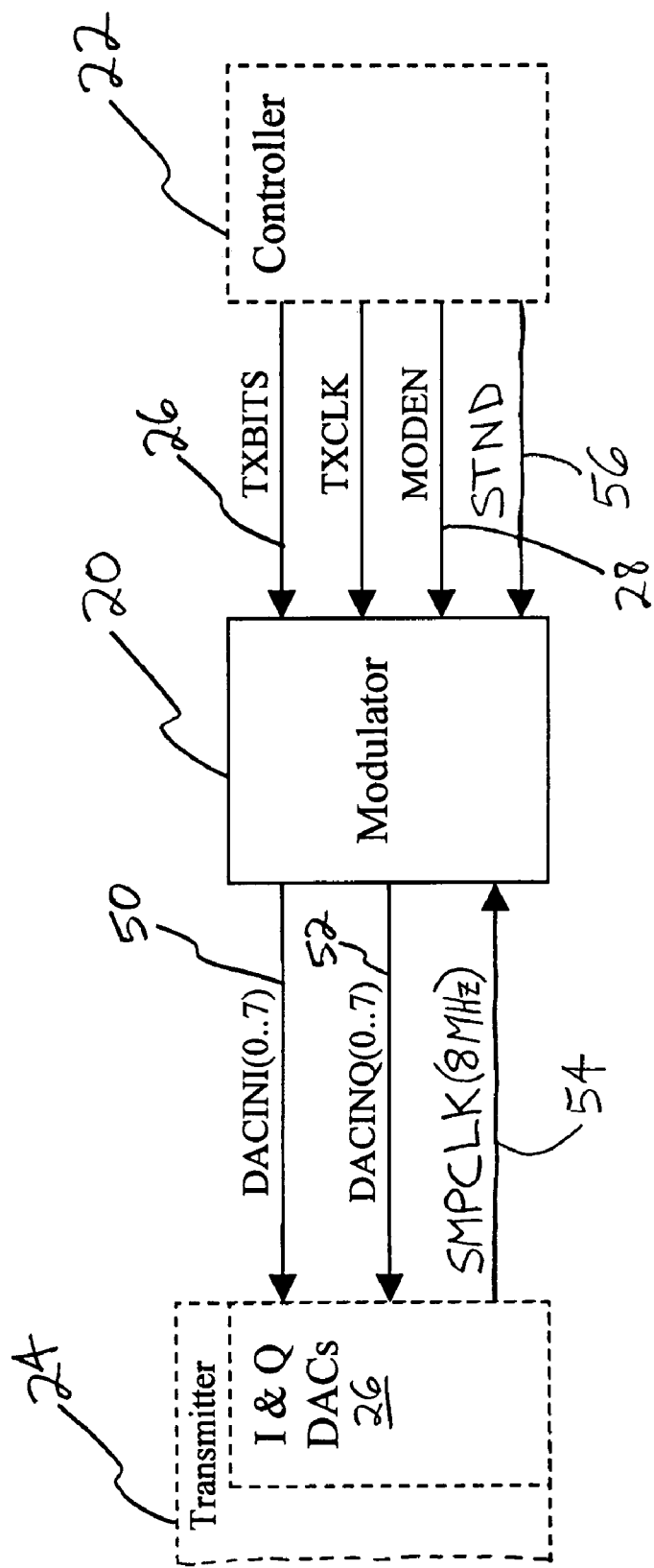
FIG. 1 is a block diagram illustrating a modulator and system made in accordance with the present invention.

Referring to FIG. 1, there is illustrated a modulator 20 made in accordance with the present invention. The modulator 20 preferably uses direct digital synthesis (DDS) techniques and a unique digital filter design to overcome the disadvantages of the conventional modulators and filters described above. The modulator 20 is flexible, accurate, and simple to implement. It is accurate because it performs DDS of the complex baseband modulated waveform. Therefore, the characteristics of the waveform which impact overall system performance can be carefully controlled. These characteristics include frequency deviation, zero crossing, channel bandwidth, and carrier frequency drift. The modulator 20 retains a high level of performance while minimizing the inherent complexity disadvantage of conventional DDS devices by adhering to a newly discovered set of principles which result in a low complexity implementation. These principals will be described in detail below. Because the modulator 20 is a digital implementation it can be conveniently used as part of a larger application specific integrated circuit (ASIC), as part of a system on a chip (SOC), as a stand-alone device, etc.

The exemplary embodiment of the modulator 20 described herein converts digital data into a binary GFSK complex baseband waveform. It provides GFSK modulation with very little penalty in complexity, cost or power. It should be well understood, however, that the modulator 20 may be modified to provide a variety of digital modulation techniques in accordance with the present invention. For example, the modulator 20 may be modified to provide many different types of FSK modulation, such as MFSK, as well as many different types of PSK modulation, such as BPSK, QPSK, MPSK, etc.

The modulator 20 is useful for wireless communications applications, such as for example cellular telephones, personal communication system (PCS) telephones, and the several emerging wireless communication standards for the interconnection of personal computer (PC) based products, such as laptop and notebook computers, personal digital assistants (PDAs), and so-called information appliances. Among these emerging wireless communications standards are the Bluetooth standard, the HomeRF standard, and IEEE 802.11. The exemplary embodiment of the modulator 20 described herein is capable of operating in accordance with the Bluetooth and HomeRF standards. It should be well understood, however, that the teachings of the present invention may be applied to many other types of wireless communication standards and are not limited to the described standards.

During use, the modulator 20 will typically be interfaced with a controller 22 and a transmitter 24 as is shown in FIG. 1. The modulator 20 receives the digital data to be transmitted from the controller 22 which may be any type of controller, such as for example a microprocessor, microcontroller, customized controller, etc. The output data of the modulator 20 will typically be provided to the I and Q channels of the transmitter 24 that includes I and Q channel digital-to-analog converters (DACs) 26. The transmitter 24 will typically be part of a radio that is tuned to operate in accordance with a wireless communication standard. Two or more of the modulator 20, controller 22 and transmitter 24 may be included on the same integrated circuit (IC), or the devices may be implemented on separate ICs. By way of example, the modulator 20 described herein may be used in the modem of the Radio/Modem/Controller (RMC) device that is described in U.S. patent application Ser. No. 09/305,330, filed May 4, 1999, and entitled "APPARATUS AND METHOD FOR WIRELESS COMMUNICATIONS", the complete disclosure of which is hereby fully incorporated into the present application by reference.

The modulator 20 maps binary data to samples of the complex baseband signal for use by the transmitter DACs 26. With respect to the modulator 20 interfaces, the TXBITS input 26 receives the actual data bits to be transmitted. In one embodiment, it operates at a 1 Msps (Megasymbols per second) toggle rate. The TXCLK input 26 receives a 1 MHz input clock for the modulator 20. Each rising edge clocks in a new data bit to the modulator 20. The MODEN input 28 is the enable input. A high state activates the modulator 20 and a low state disables it. A DACINI[7:0] bus 50 is the input to the I channel DAC 26. In the embodiment shown in FIG. 1, it is an 8-bit parallel bus that uses unsigned integer, and it operates at 8 Msps. A DACINQ[7:0] bus 52 is the input to the Q channel of the DAC 26. It has the same format as DACINI[7:0] 50. An SMPCLK line 54 carries an 8 MHz conversion clock from the DACs 26.

The modulator 20 is preferably implemented so that it can be easily switched between two or more different wireless communications standards. In such an embodiment, a STND input 56 is used to designate which communications standard is to be used. For example, STND=0 could be used to designate the Bluetooth standard, and STND=1 could be used to designate the HomeRF standard. The STND input 56 is included when multiple standards are supported because different standards tend to have different requirements. For example, the Bluetooth standard requires a Gaussian pulse shape having a pulse duration of 1 μs. In contrast, the HomeRF standard uses a rectangular pulse shape rather than Gaussian and lengthens the pulse duration from 1 μs to 1.25 μs. Again, it should be understood that other communications standards may be used in accordance with the present invention. The length of the STND input 56 should be sufficient to uniquely identify each standard.

Figure 2:
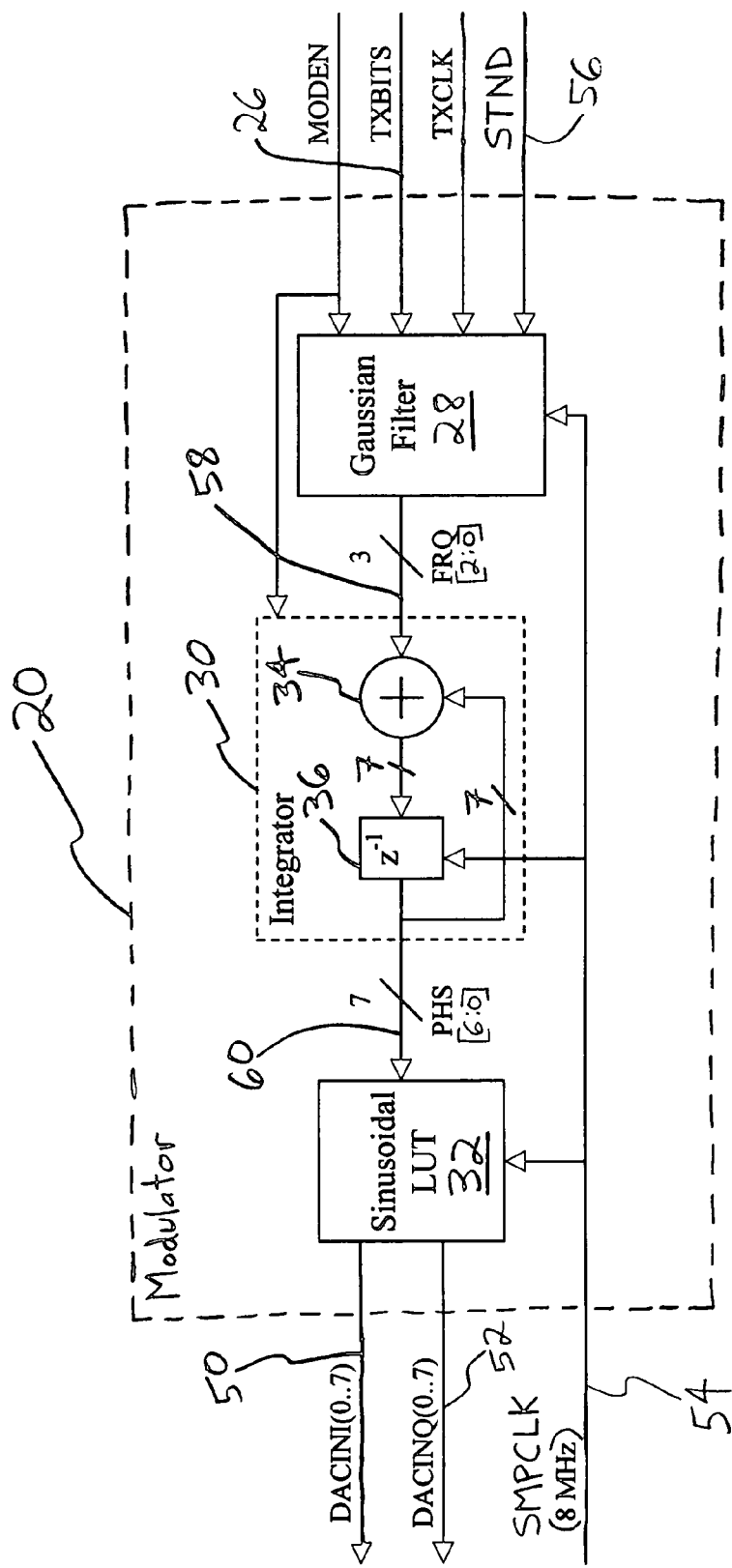
FIG. 2 is a block diagram illustrating in greater detail the modulator shown in FIG. 1.

Referring to FIG. 2, the modulator 20 preferably includes a Gaussian filter 28, an integrator 30, and a sinusoidal look-up table (LUT) 32. The flexibility of the modulator 20 can be attributed to the design of these components and to the manner in which the modulator 20 uses the Gaussian filter 28, the integrator 30, and the LUT 32 to derive the required frequency trajectory.

In general, the inventive modulator 20 functions as described below when used in accordance with the Bluetooth standard. The Gaussian filter 28 is preferably a pulse shaping filter that converts the 1 Mbps (Megabits per second) digital data received on TXBITS 26 into 8 Msps frequency samples. The frequency samples are output onto an FRQ[2:0] bus 58. FRQ[2:0] 58 preferably comprises a 3-bit bus that carries the instantaneous frequency represented as 2's complement integers. On one embodiment, the data rate of the FRQ[2:0] bus 58 is 8 Msps, and the least significant bit FRQ[0] represents 80 kHz. The integrator 30 converts the frequency input FRQ[2:0] into phase samples that are loaded onto a PHS[6:0] bus 60. PHS[6:0] 60 is a 7-bit bus that carries the phase represented as positive integers. The data rate of the PHS[6:0] bus 60 is 8 Msps in the embodiment shown, and the least significant bit PHS[0] preferably represents 360°/100=3.6°. Finally, the sinusoidal LUT 32 generates the cosine and sine of the input phase samples PHS[6:0] 60.

The Gaussian filter 28 is a low-pass filter having a Gaussian-shaped frequency response. It smoothes the digital data input on TXBITS 26 and generates a signal having low side lobes and a narrow main lobe. The filter 28 also removes the higher frequency components in the digital input to yield a compact spectrum. In this manner the Gaussian filter 28 shapes the frequency trajectory of the final transmitted signal. The design of the Gaussian filter 28 allows this trajectory to be carefully controlled such that the transmitted waveform complies with the spectrum, deviation, and envelope requirements of the appropriate communication standard. Moreover, the Gaussian filter 28 performs these functions very efficiently in terms of power consumption and transistor and logic gate count.

Although the Gaussian filter 28 is a digital finite impulse response (FIR) filter, it is preferably implemented without multipliers, adders, or accumulators. This helps to minimize the complexity of the Gaussian filter 28 as compared to conventional digital filters, which, as described above, typically include several multipliers, adders and accumulators. Instead, the Gaussian filter 28 simply produces a sequence of output samples for every 1 input sample. For example, when operating in accordance with the Bluetooth standard, the Gaussian filter 28 produces a sequence of 8 output samples for every 1 input sample.

The complexity of the Gaussian filter 28 is reduced by operating the device in accordance with five newly discovered principles, which result in minimum complexity. First, the Gaussian filter 28 assumes a train of impulse functions instead of a square wave input on the data input TXBITS 26. In other words, TXBITS 26 should always be in the form of a train of impulse functions. Such train of impulse functions will also be referred to herein as an impulse train waveform or a series of impulses. For an input impulse train waveform, the Gaussian impulse response is determined by Equation 1.

$$g(t) = \exp\left[\frac{-2\pi^2 B^2 t^2}{\ln(2)}\right] \qquad \text{Equation 1}$$

As noted above, B denotes the single sided 3-dB bandwidth of the Gaussian frequency response, G(f). Furthermore, h denotes the modulation index Δf/R, and R denotes the symbol rate 1/T. Equation 1 is normalized to a maximum value of 1.0. The maximum value should correspond to the peak frequency deviation as determined by max(FRQ), $f_s$, and NPTS (size of the Look-Up-Table (LUT), expressed mathematically as follows: Δf=$f_s$*(max(FRQ)/NPTS). For purposes of the analysis herein, it will be assumed that BT=0.5, R=1 Msps, and 0.28<h<0.35, the parameters specified by the Bluetooth standard. For BT=0.5, the 3 dB bandwidth B is exactly ½ of the symbol rate 1/T.

A second principle that contributes to reducing the complexity of the filter 28 is restricting the impulse response of the Gaussian filter 28 to one symbol in length. In other words, the window of summation over which the filter 28 observes the input signal TXBITS 26 is narrower than the pulse duration (i.e., the distance between the impulse functions). This means that in each window of summation the only data that is available for summation is one impulse function and several zeroes. Therefore, the summation process simply involves adding a scaled value of the single impulse function with several zeroes. No adders, multipliers or accumulators are needed to perform this function. Therefore, these components are eliminated from the design of the Gaussian filter 28. Given that L denotes the filter length in symbol periods and L/2 denotes the group delay, it will be assumed that L=1 in accordance with this second principal.

The third principle that contributes to reducing the complexity of the Gaussian filter 28 is selecting the modulation index such that the DAC 26 sample rate is an integer multiple of the peak frequency deviation. Assume for purposes of analysis herein that the peak frequency deviation $\Delta f$=160 kHz. This frequency deviation value falls nearly in the center of the 140 kHz to 175 kHz range specified by the Bluetooth standard. Furthermore, assume that the sample rate of the DACs 26 is 8 MHz as is represented by SMPCLK 54 shown in the figures. Those skilled in the digital modulation art will recognize that other values for the frequency deviation and sample rate can be used without departing from the scope of the present invention.

As described in greater detail below, the sinusoidal LUT 32 operates on the principle of a unit circle being divided into 100 equal phase angle sections, or "unit circle steps" as they will be denoted herein. The output FRQ[2:0] 58 of the Gaussian filter 28 indicates the change in the number of unit circle steps for each DAC sample (which is equivalent to the instantaneous frequency). Given the parameters as assumed above, the maximum value for FRQ[2:0] measured in unit circle steps/sample can be calculated. This value is denoted as $FRQ_{max}$. Specifically, $\Delta f$=(DAC sample rate)(cycles per unit circle step) $(FRQ_{max})$;

160,000 cycles/sec=(8,000,000 samples/sec)(0.01 cycles/unit circle step)$(FRQ_{max})$;

$FRQ_{max}$=(160,000 cycles/sec)(1.25×10$^{-7}$ sec/sample) (100 unit circle step/cycle);

$FRQ_{max}$=2 unit circle steps/sample(decimal)  Equation 2

Thus, the maximum value for any one value of FRQ[2:0] 58 is simply the integer 2 (decimal). Furthermore, given that FRQ[2:0] represents the instantaneous frequency and that its maximum value is 2, then FRQ[2:0]=2 represents 160 kHz (the value of $\Delta f$) and FRQ[2:0]=1 represents 80 kHz ($\Delta f$/2). Similarly, FRQ[2:0]=−2 represents −160 kHz, FRQ[2:0]=−1 represents −80 kHz, FRQ[2:0]=0 represents 0 kHz. Because the values of FRQ[2:0] can be made equal to simple integers, the complexity of the Gaussian filter 28 design can be reduced.

A fourth principle that can be used to reduce the complexity of the Gaussian filter 28 is restricting the filter coefficients to values representable by integer powers of two. Specifically, a digital implementation of a Gaussian filter uses finite precision coefficients. In the theoretical design of the Gaussian filter 28 these coefficients are restricted to values representable by integer powers of two.

A fifth principle that can be used to reduce the complexity of the Gaussian filter 28 is designing the filter coefficients such that the filter output FRQ responds to each impulse input by rising to the next peak value according to the Gaussian impulse response and remaining at that value until the next impulse input arrives. In accordance with this principle, if the new impulse input is identical to the previous input, the filter output should not change. Rather, the filter output should remain equal to the value that corresponds to the peak frequency deviation. In one embodiment of the present invention, this fifth principle can be implemented as a set of unique sequences, one for each value of current and previous input impulses. In addition to reducing the complexity of the Gaussian filter, this technique also allows for precise control of the peak frequency deviation. A classic GFSK modulator exhibits peak frequency deviation that is dependent on the input data. However, this frequency deviation data dependency often violates requirements set forth by some communication standards. Therefore, it is desirable to control or eliminate any variation in the peak frequency deviation as allowed by this fifth principle.

Figure 3:
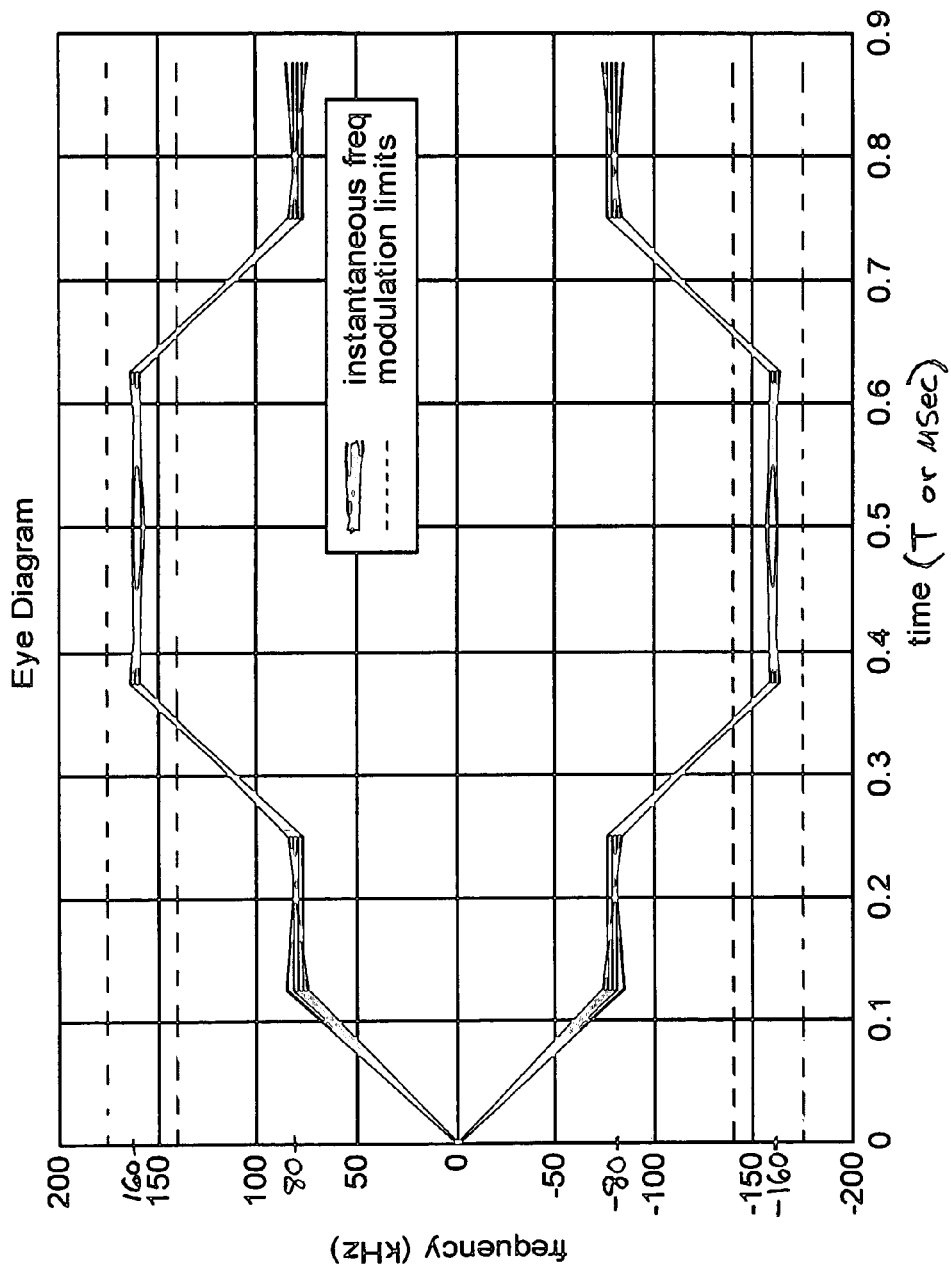
FIG. 3 is an eye diagram illustrating the instantaneous frequency generated by a conventional digital Gaussian filter/NCO combination in accordance with principles and parameters specified by the present invention.

FIG. 3 illustrates an eye diagram that was generated with a conventional digital Gaussian filter followed by a conventional digital numerical controlled oscillator (NCO) modulator using all of the principals and parameters that have been described and assumed above. Additionally, the number of samples per symbol K was set equal to 8, the length of the Gaussian filter in symbols L was set equal to 1, the number of bits used for each Gaussian filter coefficient Nb was set equal to 2, the modulation index h was set equal to 0.32, the number of samples contained in the NCO look-up table (LUT) Nnco was et equal to 100, and the number of bits used for each I and Q output sample Nq was set equal to 8.

The plot in FIG. 3 is of instantaneous frequency versus time. The time axis is measured in symbol periods T. Because R=1/T=1 Msps, the symbol period T=1 μsec. Thus, the time axis is also measured in microseconds. As shown in FIG. 3, the instantaneous frequency gradually rises from 0 kHz to 80 kHz (and −80 kHz) and then levels off. After that, the instantaneous frequency gradually rises to 160 kHz (and −160 kHz) and levels off. After reaching the maximum frequency deviation of 160 kHz, the instantaneous frequency gradually decreases back to 80 kHz (and −80 kHz) and levels off.

Given the simplicity of the instantaneous frequency versus time diagram of FIG. 3, and given the analysis above (which demonstrated that FRQ[2:0]=2 represents 160 kHz, FRQ[2:0]=1 represents 80 kHz, etc.), the Gaussian filtering function displayed in FIG. 3 can be approximated using relatively simple combinatorial logic. The simple logic circuit is much less complex than a complete, conventional digital filter. This simple design implementation can be used by adhering to the five principles described above which result in minimum complexity, namely: (1) the Gaussian filter 28 assumes a series of impulses as its input TXBITS; (2) its impulse response is restricted to one symbol in length; (3) the modulation index is selected such that the DAC 26 sample rate is an integer multiple of the peak frequency deviation; and (4) the filter coefficients are restricted to values representable by integer powers of two.

Therefore, in accordance with the present invention, the Gaussian filter 28 is implemented to operate in accordance with the data shown in FIG. 4. This data is designed to very accurately approximate the Gaussian filtering function shown in FIG. 3. In other words, the Gaussian filter 28 operates to produce a Gaussian pulse by generating the specified predetermined and fixed sequences of instantaneous frequency samples for the 3-bit output FRQ[2:0] in response to the data input TXBITS. In the figure, the signal PREVBIT is equal to the previous value of TXBITS, and PREVBIT is initialized to zero. Eight instantaneous frequency samples $FRQ_{1-8}$[2:0] are generated for each TXBITS sample, and the binary versions of the instantaneous frequency samples $FRQ_{1-8}$[2:0] are formatted in 3-bit, 2's complement integers. The STND input is assumed to be set to 0 to indicate use of the Bluetooth standard, which requires a Gaussian pulse shape with a pulse duration of 1 μs.

Figure 5A:
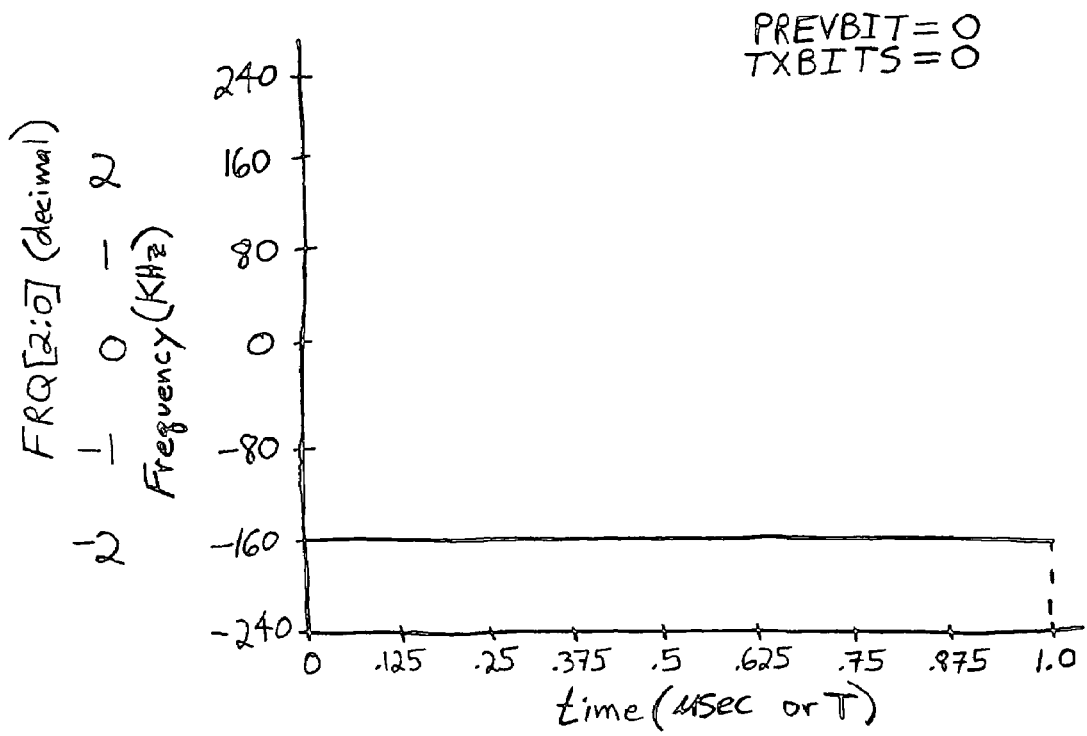
FIGS. 5A, 5B, 5C and 5D are frequency-versus-time diagrams illustrating the data shown in FIG. 4.
Figure 5B:
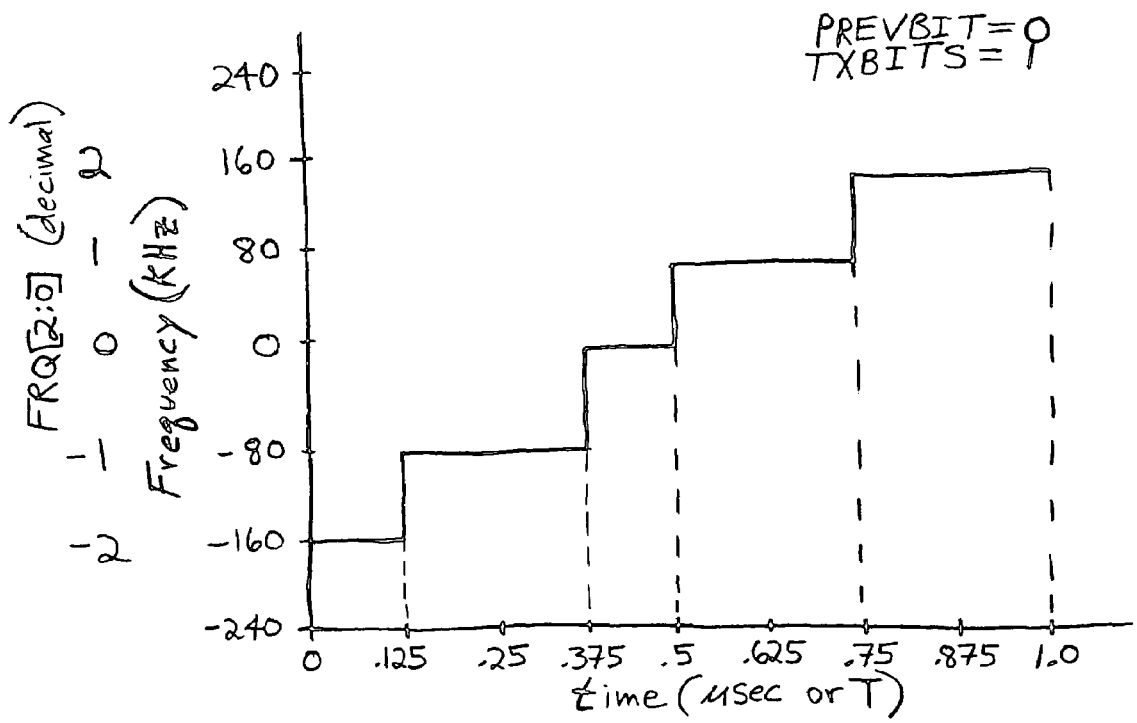
Figure 5C:
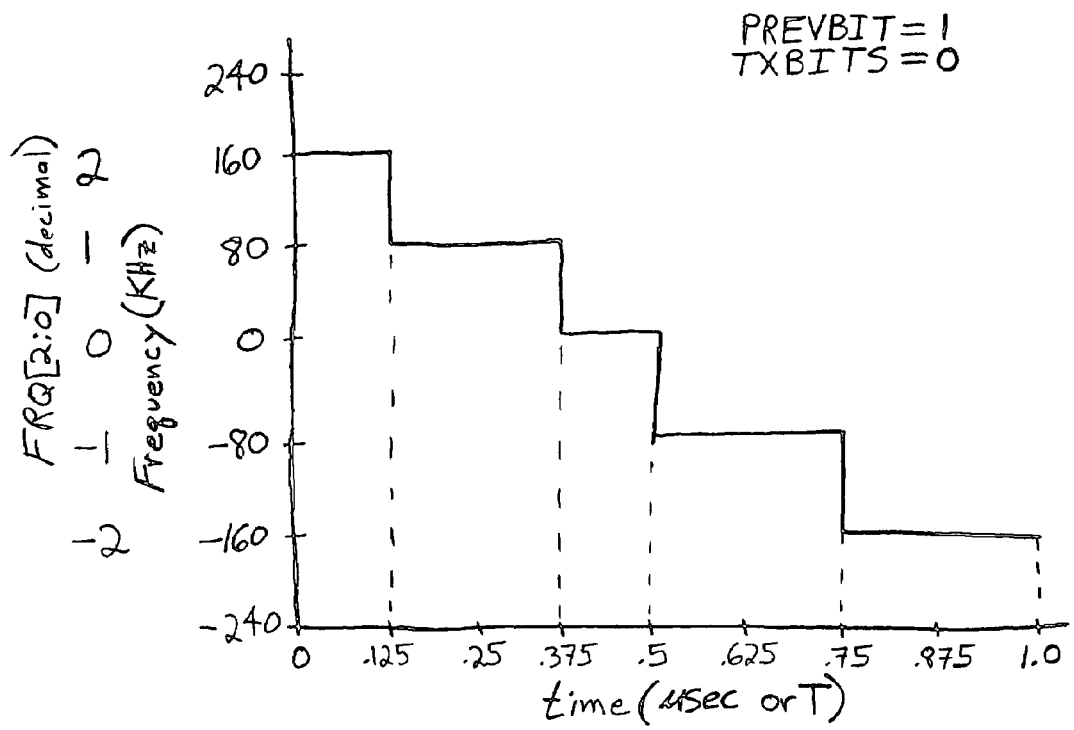
Figure 5D:
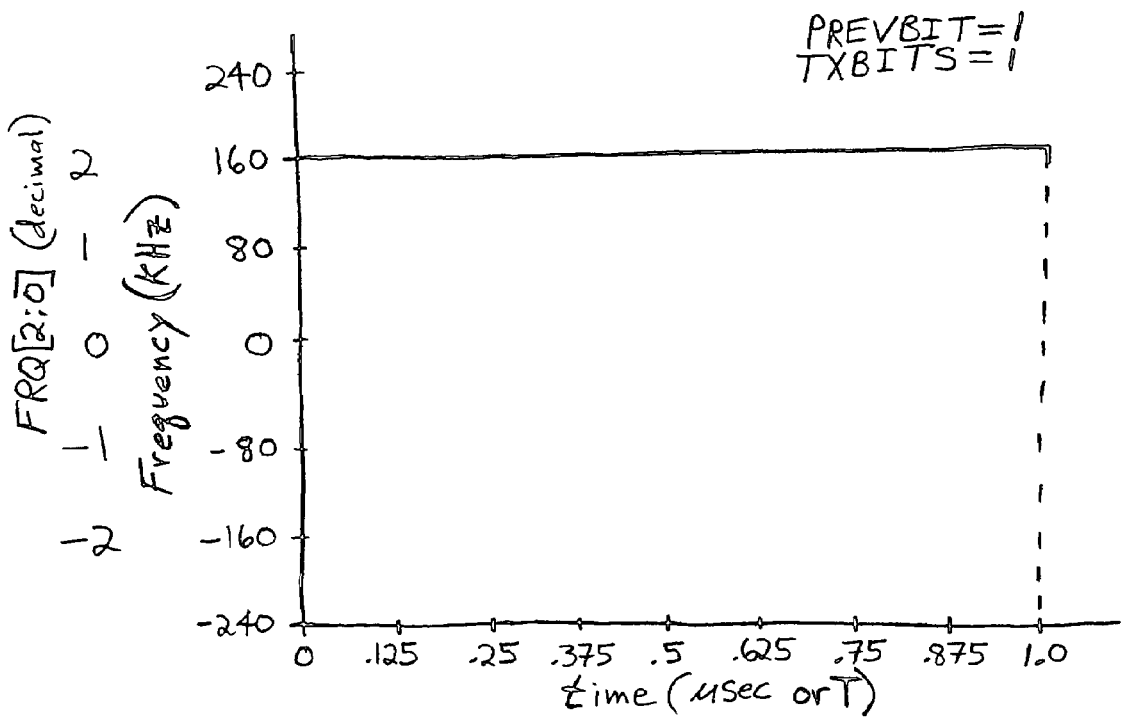

FIGS. 5A, 5B, 5C and 5D are frequency versus time diagrams that respectively correspond to the four input data scenarios shown in FIG. 4. Each of the four input data scenarios corresponds to different predetermined and fixed sequence of instantaneous frequency samples $FRQ_{1-8}[2:0]$. One of these predetermined and fixed sequences of instantaneous frequency samples are generated in response to each received impulse at TXBITS. Specifically, FIG. 5A illustrates the scenario for PREVBIT=0 and TXBITS=0, FIG. 5B illustrates the scenario for PREVBIT=0 and TXBITS=1, FIG. 5C illustrates the scenario for PREVBIT=1 and TXBITS=0, and FIG. 5D illustrates the scenario for PREVBIT=1 and TXBITS=1. Note that the least significant bit of FRQ[2:0] represents 80 kHz. These diagrams illustrate that the fixed output sequences for FRQ[2:0] form an adequate Gaussian pulse. The diagrams also illustrate that the Gaussian pulse has a duration of 1 µs. This is due to the clock SMPCLK having a frequency of 8 MHz, giving each output sample a duration of 0.125 µs, which gives eight samples a duration of 1 µs (0.125 µs×8).

Figure 6:
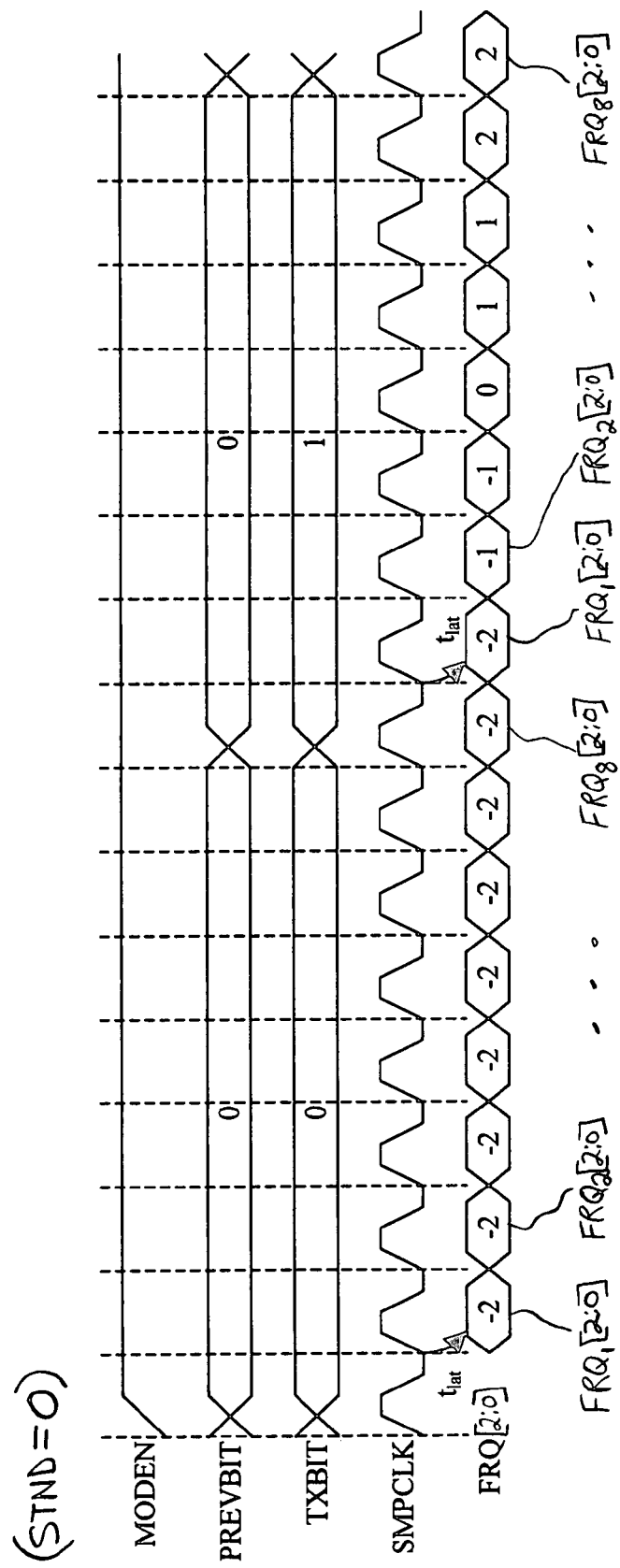
FIGS. 6 and 7 are timing diagrams illustrating the operation of the filter shown in FIG. 2.

Referring now to FIG. 6, there is illustrated a timing diagram that shows a typical FRQ[2:0] 58 output sequence of the Gaussian filter 28 for two values of TXBITS 26. The start of the first sequence $FRQ_1[2:0]$ is triggered by the rising edge of MODEN. Whenever MODEN is low, both TXDATA and PREVBIT are set to zero. This timing diagram is intended to illustrate the relationship between TXBITS 26 inputs and FRQ[2:0] 58 outputs. It does not attempt to show any specific timing requirements. In particular, the latency between TXBITS and FRQ, $t_{lat}$, may be as long as 1 µs providing it is consistent for subsequent samples of TXBITS.

Given the data shown in FIGS. 4, 5A-5D and 6, the Gaussian filter 28 can be easily implemented using combinatorial logic. For example, any of the well known circuit design software applications, such as VHDL (Very high speed integrated circuit Hardware Description Language), may be used to generate a combinatorial logic design for the Gaussian filter 28 given the data illustrated and described herein. Furthermore, the five principles on which the design of Gaussian filter 28 is based are valid for a wide range of FSK signals. In other words, the Gaussian filter 28 can be used to provide many other types of FSK modulation in addition to GFSK. Furthermore, by modifying the filter coefficients one could implement multiple level FSK (M-FSK). In one embodiment, a multiple level FSK (M-FSK) modulator is implemented by increasing the number of sequences: for example, a 2-level FSK is implemented using four sequences; and a 4-level FSK is implemented using eight sequences. Those skilled in the art of digital modulator design shall recognize that variations may be made to the number of sequences used without departing from the scope of the present invention.

Figure 7:
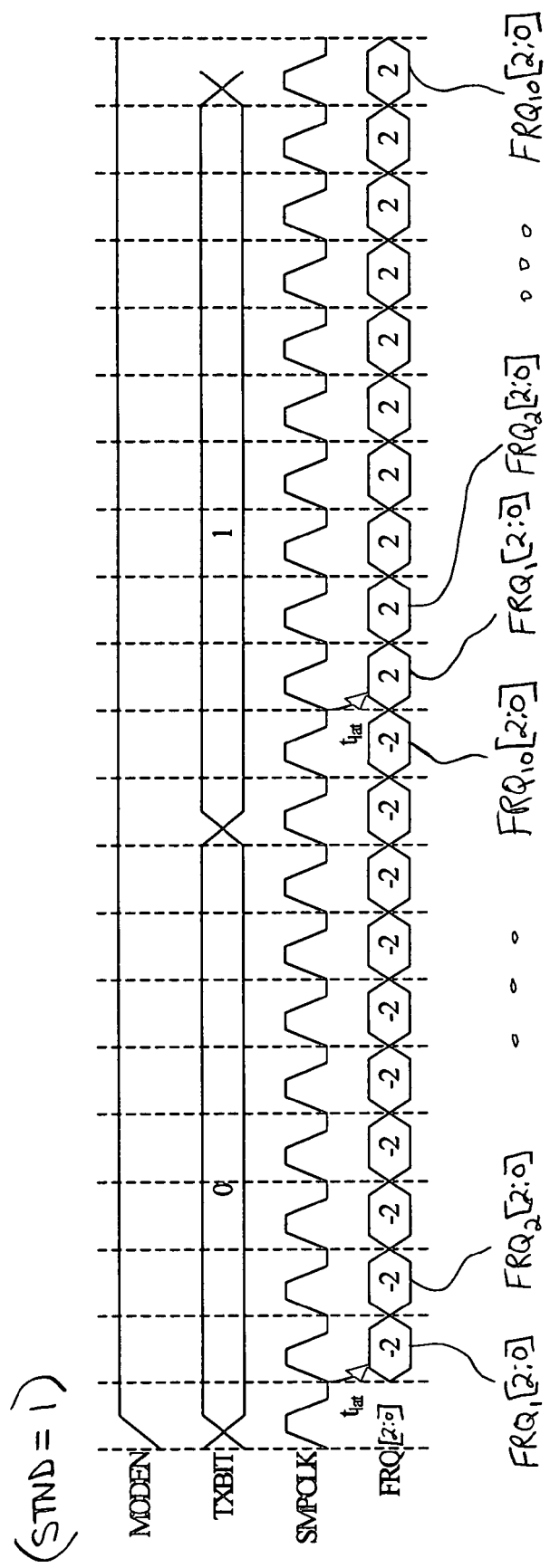

The above description focused on operating the modulator 20 in the Bluetooth mode (i.e., in accordance with the Bluetooth specification). The modulator 20 can alternately be changed to a HomeRF mode by setting the STND input 56 to 1. As noted above, when the Gaussian filter 28 is operated in the HomeRF mode a rectangular pulse shape is used rather than a Gaussian pulse shape and the pulse duration is lengthened from 1 µs to 1.25 µs. This simplifies the operation of the Gaussian filter 28 from that described above. Specifically, FIG. 7 illustrates a timing diagram of the Gaussian filter 28 when operating in the HomeRF mode. As shown in FIG. 7, the output sequence of FRQ[2:0] is a series of −2/110 (decimal/binary 2's complement integers) when TXBITS=0 and a series of +2/010 when TXBITS=1. These are the only values for FRQ[2:0]. Additionally, ten frequency samples $FRQ_{1-10}[2:0]$ are generated for each TXBITS sample. This is because the duration of each output sample is 0.125 µs and to have an output pulse duration of 1.25 µs requires a total of ten samples. It should be noted that the pulse duration is not determined by the modulator 20 but by the rate of the TXBIT input signal. Therefore, the controller 22 should drive TXBIT for the proper number of SMPCLK cycles.

Referring back to FIG. 2, the integrator 30 converts the frequency input FRQ[2:0] to a phase output PHS[6:0] by forming a cumulative sum of the FRQ[2:0] samples. The integrator 30 preferably includes a 7-bit adder 34 and a 7-bit register 36. For each rising edge of SMPCLK, the integrator 30 clocks the current sum from the output of the adder 34 into the register 36. The 7-bit output of the register 36 is then added to the 3-bit FRQ[2:0] in the adder 34 to form the next sum.

As noted above, in one embodiment of the present invention, the FRQ[2:0] input samples are 3-bit, 2's complement integers. In order for the adder 34 to perform proper addition, the least significant bit of the FRQ[2:0] input should be aligned with the least significant bit of the 7-bit output of the register 36. Therefore, the integrator 30 preferably sign extends the 3-bit FRQ[2:0] input to 7-bits before adding it to the 7-bit output of the register 36. Furthermore, the adder 34 is implemented as modulo 100 (decimal) adder in one embodiment. That is, the output of the adder 34 is between decimal 0 and 99 inclusive. The reason for this will become apparent when the sinusoidal LUT 32 is described below. Sums that are generated by the adder 34 that are outside of the 0 to 99 range are wrapped by the adder 34 to results that are within the range. For example 1+99=0, 5+98=3, 0−5=95, etc. The modulo 100 addition rule for the integrator 30 is illustrated in TABLE 1 below.

TABLE 1

Modulo 100 Addition Rule for Integrator 30

| INPUT RANGE | SUM |
|---|---|
| FRQ + PHS < 0 | FRQ + PHS + 100 |
| 0 ≦ FRQ + PHS < 100 | FRQ + PHS |
| 100 ≦ FRQ + PHS | FRQ + PHS − 100 |

TABLE 1 assumes that MODEN=1. When MODEN=0, the integrator 30 is frozen at whatever value it contained before MODEN transitioned to zero.

Figure 8:
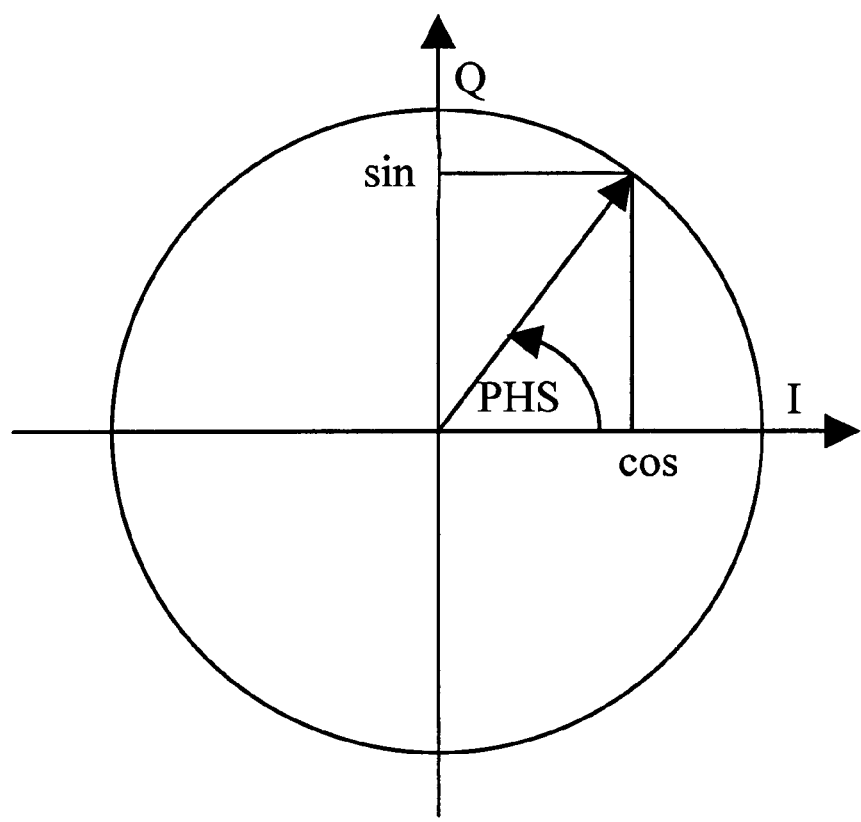
FIG. 8 is a unit circle diagram illustrating the operation of the sinusoidal look-up table shown in FIG. 2.

In the embodiment shown in the Figures, PHS[6:0] is a 7-bit bus that carries the phase represented as positive integers. The rate of PHS[6:0] is 8 Msps in one embodiment. The sinusoidal LUT 32 converts the phase samples PHS[6:0] to sine and cosine samples. Referring now to FIG. 8, the sine and cosine samples can be thought of as the I and Q values of a unit magnitude vector on the complex plane (or unit circle). The PHS[6:0] input represents the angle of the vector as shown in FIG. 8.

The unit circle is preferably divided into 100 equal phase angle sections or "unit circle steps". The phase angle between each unit circle step is 360°/100=3.6°. Each unit circle step is quantized to 7 bits so that the unit circle steps correspond to the values of PHS[6:0]. This way the least significant bit of PHS[6:0] represents 360°/100=3.6°. Because the adder 34 is implemented as modulo 100 (decimal), the decimal value of PHS[6:0] will always be between 0 and 99 inclusive. Thus, in this embodiment PHS[6:0] is capable of representing the position of the unit vector in 3.6° increments.

In order to have 25 evenly spaced unit circle steps in each quadrant of the unit circle, none of the 100 unit circle steps falls exactly on the I and Q axes of the circle. Instead, the first unit circle step represented by PHS[6:0]=0 (decimal) is actually located at a phase angle of 3.6°/2=1.8° above the I axis, and the last unit circle step represented by PHS[6:0]=99 (decimal) is actually located at a phase angle of 1.8° below the I axis. Thus, the angle between these two unit circle steps is exactly 3.6°, and 25 unit circle steps fit completely within each of the 4 quadrants of the circle.

One implementation of the LUT 32 is realized by storing all of the sine and cosine values that correspond to the 100 unit circle steps of the unit circle. For example, two read only memories (ROMs) that each have a size of 8×100 could be used. One ROM would be used to store all 100 sine values with 8 bits being used for each sine value, and the other ROM would be used to store all 100 cosine values with 8 bits being used for each cosine value. The ROMs would be addressed by PHS[6:0] to find the appropriate sine and cosine samples for the given phase. The addressed cosine sample is loaded onto the DACINI[0:7] bus 50 (FIGS. 1 and 2) for the I channel DAC 26, and the addressed sine sample is loaded onto the DACINQ[0:7] bus 52 (FIGS. 1 and 2) for the Q channel DAC 26.

Assuming that all 100 sine samples and all 100 cosine samples are stored in ROMs, the precise 8-bit binary values of the sines and cosines stored in the ROMs must be determined. Both DACINI [7:0] and DACINQ [7:0] are 8-bit parallel buses that use unsigned integers operating at a data rate of 8 Msps. Therefore, the sine and cosine samples are also stored as unsigned integers. In general, the maximum positive value for any sine or cosine is represented as all ones, or "11111111", and the maximum negative value for any sine or cosine is represented as all zeroes, or "00000000". This is the format used by the DACs 26 in the preferred embodiment.

The cosine values for all 100 unit circle steps, and thus the values of DACINI[7:0], can be calculated using the following equations:

$$DACINI(n) = 128 + \text{round}\left\{K * \cos\left[2\pi\left(\frac{0.5+n}{N}\right)\right] - \frac{1}{2}\right\} \quad \text{Equation 3}$$

where, N=100, n=0 to N−1, and $$K = \frac{127.5}{\cos\left[2\pi\left(\frac{0.5}{N}\right)\right]} \quad \text{Equation 4}$$

These equations result in a balanced table that makes maximum use of all 8-bits and is free from any DC bias. The results of these equations for the first 25 cosine samples (i.e., the first quadrant of the unit circle) are illustrated in TABLE 2 in decimal and binary formats.

TABLE 2

First Quadrant Cosine Samples

| PHS[6:0] (decimal) | PHS[6:0] (binary) | Cosine (decimal) | DACINI[7:0] (binary) |
|---|---|---|---|
| 0 | 000 0000 | 255 | 1111 1111 |
| 1 | 000 0001 | 254 | 1111 1110 |
| 2 | 000 0010 | 253 | 1111 1101 |
| 3 | 000 0011 | 252 | 1111 1100 |
| 4 | 000 0100 | 250 | 1111 1010 |
| 5 | 000 0101 | 248 | 1111 1000 |
| 6 | 000 0110 | 245 | 1111 0101 |

TABLE 2-continued

First Quadrant Cosine Samples

| PHS[6:0] (decimal) | PHS[6:0] (binary) | Cosine (decimal) | DACINI[7:0] (binary) |
|---|---|---|---|
| 7 | 000 0111 | 241 | 1111 0001 |
| 8 | 000 1000 | 237 | 1110 1101 |
| 9 | 000 1001 | 233 | 1110 1001 |
| 10 | 000 1010 | 228 | 1110 0100 |
| 11 | 000 1011 | 223 | 1101 1111 |
| 12 | 000 1100 | 218 | 1101 1010 |
| 13 | 000 1101 | 212 | 1101 0100 |
| 14 | 000 1110 | 206 | 1100 1110 |
| 15 | 000 1111 | 199 | 1100 0111 |
| 16 | 001 0000 | 192 | 1100 0000 |
| 17 | 001 0001 | 185 | 1011 1001 |
| 18 | 001 0010 | 178 | 1011 0010 |
| 19 | 001 0011 | 171 | 1010 1011 |
| 20 | 001 0100 | 163 | 1010 0011 |
| 21 | 001 0101 | 155 | 1001 1011 |
| 22 | 001 0110 | 147 | 1001 0011 |
| 23 | 001 0111 | 140 | 1000 1100 |
| 24 | 001 1000 | 132 | 1000 0100 |

Assuming that all of the sine and cosine values for the 100 samples are stored in two 8×100 ROMs, the cosine entries for PHS[6:0]=25 through 99 are easily calculated using the above equations 3 and 4. The sine entries for PHS[6:0]=0 through 99 are also easily calculated using similar equations. All 100 of the 8-bit samples for DACINI[7:0] can be stored in a first ROM, and all 100 of the 8-bit samples for DACINQ[7:0] can be stored in a second ROM.

While the two-ROM approach is straight forward, the increased ROM storage requirement introduces increases in power consumption, reduced reliability, reduced speed, and increased cost. Thus, it is desirable to reduce the ROM size as much as possible in order to reduce the size and cost of the device. In accordance with the present invention, the ROM size in the LUT 32 has been reduced considerably by storing only a single quadrant of the unit circle described above with reference to FIG. 8. Furthermore, preferably only the cosine values of the single quadrant are stored. The values for the other quadrants and all of the sine values are calculated from the data stored in the ROM.

Figure 9:
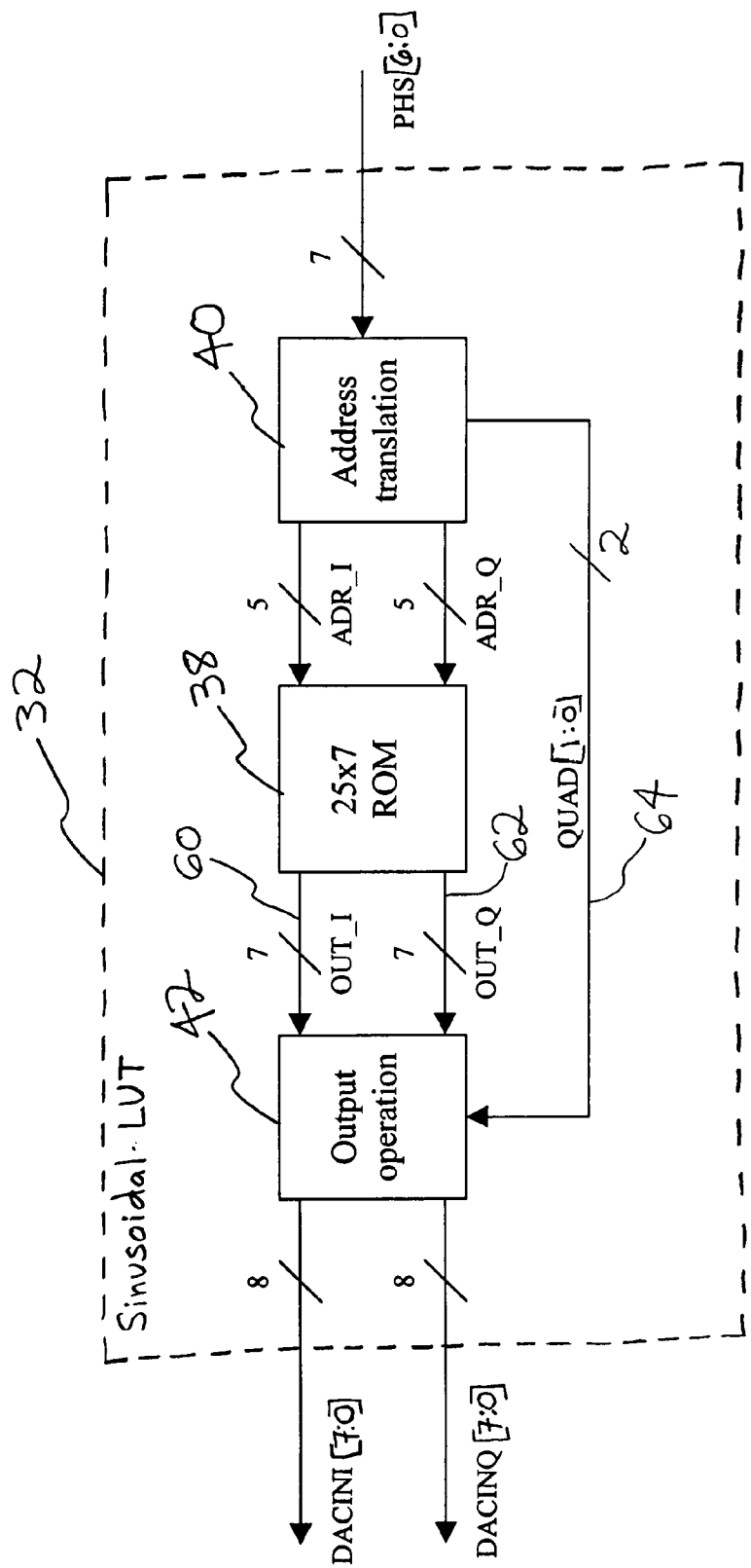
FIG. 9 is a block diagram illustrating in greater detail the sinusoidal look-up table shown in FIG. 2.

In order for the LUT 32 to support all 100 steps of the unit circle, translations and calculations are performed to derive the sine and cosine samples for the other quadrants. FIG. 9 illustrates one embodiment of the sinusoidal LUT 32 of FIG. 2 in greater detail. As shown in FIG. 9, the LUT 32 preferably includes a 25×7 ROM 38, an address translation stage 40, and an output operation stage 42.

In the embodiment shown in FIG. 9, the single ROM 38 stores only 25 cosine samples instead of all 100, and each sample occupies only 7 bits instead of 8 bits. In this embodiment, none of the sine samples are stored. Specifically, TABLE 3 illustrates the data that is preferably stored in the ROM 38.

TABLE 3

ROM 38 Contents

| PHS[6:0] (decimal) | PHS[6:0] (binary) | DACINI[6:0] (binary) |
|---|---|---|
| 0 | 000 0000 | 111 1111 |
| 1 | 000 0001 | 111 1110 |
| 2 | 000 0010 | 111 1101 |
| 3 | 000 0011 | 111 1100 |

TABLE 3-continued

ROM 38 Contents

| PHS[6:0] (decimal) | PHS[6:0] (binary) | DACINI[6:0] (binary) |
|---|---|---|
| 4 | 000 0100 | 111 1010 |
| 5 | 000 0101 | 111 1000 |
| 6 | 000 0110 | 111 0101 |
| 7 | 000 0111 | 111 0001 |
| 8 | 000 1000 | 110 1101 |
| 9 | 000 1001 | 110 1001 |
| 10 | 000 1010 | 110 0100 |
| 11 | 000 1011 | 101 1111 |
| 12 | 000 1100 | 101 1010 |
| 13 | 000 1101 | 101 0100 |
| 14 | 000 1110 | 100 1110 |
| 15 | 000 1111 | 100 0111 |
| 16 | 001 0000 | 100 0000 |
| 17 | 001 0001 | 011 1001 |
| 18 | 001 0010 | 011 0010 |
| 19 | 001 0011 | 010 1011 |
| 20 | 001 0100 | 010 0011 |
| 21 | 001 0101 | 001 1011 |
| 22 | 001 0110 | 001 0011 |
| 23 | 001 0111 | 000 1100 |
| 24 | 001 1000 | 000 0100 |

The reason that only 7 bits, i.e., DACINI[6:0], are needed is that the most significant bits of the sine and cosine samples, i.e., DACINI[7] and DACINQ[7], are used primarily to indicate the quadrant of the unit circle. For example, if TABLE 2 included all 100 cosine samples, it would illustrate that DACINI[7]=1 for all samples in the first quadrant, DACINI[7]=0 for all samples in the second quadrant, DACINI[7]=0 for all samples in the third quadrant, and DACINI[7]=1 for all samples in the fourth quadrant. Similarly, it can be shown for the sine samples that DACINQ[7]=1 for all samples in the first quadrant, DACINQ[7]=1 for all samples in the second quadrant, DACINQ[7]=0 for all samples in the third quadrant, and DACINQ[7]=0 for all samples in the fourth quadrant. As described below in more detail, the address translation stage 40 determines which quadrant each phase sample PHS[6:0] is in, and therefore, this data can be added to the output later. Therefore, there is no need to store the most significant bit DACINI[7] in the ROM 38. This reduces the required size of the ROM 38.

The address translation stage 40 preferably performs the address translations that are required to derive the cosine values for PHS[6:0]=25 through 99 and the sine values for PHS[6:0]=0 through 99. Specifically, each value of PHS[6:0] is translated so that an equivalent value of cosine or sine can be located in the ROM 38 (i.e., as indicated in TABLE 3). TABLE 4 illustrates the translations that are performed by the address translation stage 40 to compute ADR_I[4:0]. TABLE 5 illustrates the translations that are performed by the address translation stage 40 to compute ADR_Q[4:0].

TABLE 4

Translations Required for ADR_I[4:0]

| PHS[6:0] (decimal) | Address translation ADR_I[4:0] |
|---|---|
| 0 ≦ PHS ≦ 24 | PHS |
| 25 ≦ PHS ≦ 49 | 49 - PHS |
| 50 ≦ PHS ≦ 74 | PHS - 50 |
| 75 ≦ PHS ≦ 99 | 99 - PHS |

TABLE 5

Translations Required for ADR_Q[4:0]

| PHS[6:0] (decimal) | Address translation ADR_Q[4:0] |
|---|---|
| 0 ≦ PHS ≦ 24 | 24 - PHS |
| 25 ≦ PHS ≦ 49 | PHS - 25 |
| 50 ≦ PHS ≦ 74 | 74 - PHS |
| 75 ≦ PHS ≦ 99 | PHS - 75 |

The translated addresses ADR_I[4:0] and ADR_Q[4:0] will always fall in the range of 0 to 24 decimal inclusive, i.e., the values for PHS[6:0] that are shown in TABLE 3. As such, these buses require only 5 bits each.

The address translation stage 40 also generates quadrant information and places it on the QUAD[1:0] bus. Depending upon the value of the PHS[6:0] sample, QUAD[1:0] indicates whether the sample falls within the first, second, third or fourth quadrant. For example, the value of QUAD[1:0] could be computed as shown in TABLE 6.

TABLE 6

Values of QUAD[1:0]

| PHS[6:0] (decimal) | QUAD[1:0] |
|---|---|
| 0 ≦ PHS ≦ 24 | 00 |
| 25 ≦ PHS ≦ 49 | 01 |
| 50 ≦ PHS ≦ 74 | 10 |
| 75 ≦ PHS ≦ 99 | 11 |

The data that is output by the ROM 38 is placed on the buses OUT_I[7:0] 60 and OUT_Q[7:0] 62, which are received by the output operation stage 42. The output operation stage 42 also receives the quadrant information via a QUAD[1:0] input line 64. Using the quadrant information, the output operation stage 42 manipulates OUT_I[7:0] and OUT_Q[7:0] in the appropriate manner and adds a bit to the most significant position to form DACINI[7:0] and DACINQ[7:0], respectively. The purpose of the manipulation based on the quadrant information is so that the values of DACINI[7:0] and DACINQ[7:0] reflect the appropriate positive or negative value of the cosine and sine, respectively. As described above, although DACINI[7:0] and DACINQ[7:0] use unsigned integers, they are scaled such that the maximum positive value is represented as all ones, or "11111111", and the maximum negative value is represented as all zeroes, or "00000000". Therefore, the positive cosine values listed in TABLE 3 can be manipulated to reflect the negative cosine values simply by performing a complement operation on the data values. The complement operation simply inverts all of the bits in the output word.

TABLE 7 illustrates the operations performed by the output operation stage 42 in order to compute DACINI[7:0]. TABLE 8 illustrates the operations performed by the output operation stage 42 in order to compute DACINQ[7:0].

TABLE 7

Operations for Computing DACINI[7:0]

| PHS[6:0] | QUAD[1:0] | Output Operation Performed on OUT_I[6:0] |
|---|---|---|
| 0 ≦ PHS ≦ 24 | 00 | Set DACINI[7] = 1; no other operation |
| 25 ≦ PHS ≦ 49 | 01 | Perform Complement and Set DACINI[7] = 0 |
| 50 ≦ PHS ≦ 74 | 10 | Perform Complement and Set DACINI[7] = 0 |
| 75 ≦ PHS ≦ 99 | 11 | Set DACINI[7] = 1; no other operation |

TABLE 8

Operations for Computing DACINQ[7:0]

| PHS[6:0] | QUAD[1:0] | Output Operation Performed on OUT_Q[6:0] |
|---|---|---|
| 0 ≦ PHS ≦ 24 | 00 | Set DACINQ[7] = 1; no other operation |
| 25 ≦ PHS ≦ 49 | 01 | Set DACINQ[7] = 1; no other operation |
| 50 ≦ PHS ≦ 74 | 10 | Perform Complement and Set DACINQ[7] = 0 |
| 75 ≦ PHS ≦ 99 | 11 | Perform Complement and Set DACINQ[7] = 0 |

The buses DACINI[7:0] and DACINQ[7:0] carry the cosine and sine samples, respectively, of the complex baseband signal. In other words, as a result of the teachings herein, the binary data carried by TXBITS is mapped to these cosine and sine samples of the complex baseband signal. After the output operation stage 42, the data on the buses DACINI[7:0] and DACINQ[7:0] is processed by the transmitter DACs 26 (FIG. 1), which converts the samples to analog form.

By modifying the contents of the ROM LUT 38, other types of FSK modulation can be implemented, such as, for example, M-FSK. More specifically, M-FSK modulation requires multiple discrete tones. Each frequency must be represented within the Look-Up-Table (LUT) in accordance to the formula: f=($f_s$*FRQ)/NPTS; wherein f=the tone frequency, $f_s$=the sample rate (e.g., 8 MHz), and NPTS is the size of the LUT (e.g., 100). Furthermore, in an alternative embodiment of the inventive modulator 20, by bypassing the integrator 30, many types of phase shift keying (PSK) modulation can be implemented, such as for example binary PSK (BPSK), quaternary PSK (QPSK), Multilevel PSK (MPSK), etc.

The modulator 20 of the present invention preferably is a fully digital modulation circuit. As described herein it performs GFSK modulation with very little complexity in terms of design, and it can be modified for use with other modulation schemes. It conserves power because of its simplicity, and its very low power consumption makes it suitable for battery powered devices. It can be used as part of a larger application specific integrated circuit (ASIC), as part of a system on a chip (SOC), as a stand-alone device, etc. Furthermore, the modulator 20 is capable of meeting the following performance specifications:

| | |
|---|---|
| 20 dB bandwidth: | <1 MHz |
| Symbol timing accuracy: | <+/−20 ppm |
| In-band spurious: | <−20 dBc at +/−550 kHz |
| | <−20 dBm 2 channels away |
| | <−40 dBm 3 or more channels away |
| Carrier accuracy: | +/−75 kHz |
| Carrier drift: | +/−25 kHz over a single slot packet |

The inventive modulator 20 is preferably formed on a silicon-on-insulator (SOI) substrate, using well-known SOI BiCMOS IC manufacturing processes. In SOI devices an insulating layer separates circuit devices from a solid silicon substrate. The advantages of SOI BiCMOS process technology include greater signal isolation, higher speed devices with lower power consumption, and dense digital CMOS logic. The circuitry of the present invention is preferably implemented in an SOI BiCMOS process technology that uses bonded wafers ("bonded SOI"). Bonded SOI processes are well-known to those of ordinary skill in the art and are believed to be currently available. Exemplary SOI BiCMOS process technologies that may be used to implement the present invention are described in U.S. Pat. No. 5,661,329 entitled "Semiconductor Integrated Circuit Device Including An Improved Separating Groove Arrangement", U.S. Pat. No. 5,773,340 entitled "Method of Manufacturing a BIMIS", and U.S. Pat. No. 5,430,317 entitled "Semiconductor Device", the complete disclosures of which are all hereby fully incorporated into the present application by reference.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. An apparatus that includes a digital modulator, the digital modulator comprising:
    a digital filter configured to receive a pulsed input comprising a series of pulses, process the series of pulses as if the series of pulses is a series of impulses, and generate a predetermined and fixed sequence of instantaneous digital frequency samples as outputs in response to each pulse, wherein the generated instantaneous digital frequency samples represent a predetermined type of filtering of the series of impulses;
    an integrator configured to receive and integrate the instantaneous digital frequency samples to generate a sequence of digital phase samples; and
    a look-up table (LUT) stage configured to receive the digital phase samples and to generate digital samples of a complex baseband signal in response to each digital phase sample;
    wherein a number of bits used to represent each generated instantaneous digital frequency sample is selected based upon a resolution of a frequency variation associated with the complex baseband signal, and wherein a number of bits used to represent each generated digital phase sample is selected based upon a unit circle in a complex plane divided by a resolution of the generated sequence of digital phase samples.

2. An apparatus in accordance with claim 1, wherein the predetermined type of filtering of the series of impulses comprises a Gaussian shaped filtering function.

3. An apparatus in accordance with claim 1, wherein an impulse response of the filter is restricted to one symbol in length.

4. An apparatus in accordance with claim 1, wherein each sequence of instantaneous frequency samples includes a total of eight (8) instantaneous frequency samples.

5. An apparatus in accordance with claim 1, wherein each sequence of instantaneous frequency samples includes a total of ten (10) instantaneous frequency samples.

6. An apparatus in accordance with claim 1, wherein the LUT stage is further configured to receive the phase samples and to generate sine and cosine samples of the complex baseband signal in response to each phase sample.

7. An apparatus in accordance with claim 1, wherein the LUT stage comprises:
a read only memory (ROM) which stores only a portion of a total number of needed cosine samples.

8. An apparatus in accordance with claim 7, wherein the LUT stage further comprises:
an address translation circuit configured to translate a phase sample into an address that identifies a stored cosine sample having a magnitude equal to a needed cosine or sine sample that is not stored in the ROM.

9. An apparatus in accordance with claim 8, wherein the LUT stage further comprises: an output operation stage configured to perform an operation on the stored cosine sample to reflect a sign of the needed cosine or sine sample.

10. An apparatus in accordance with claim 1, further comprising:
a controller coupled to the modulator and configured to generate the pulsed input.

11. An apparatus in accordance with claim 1, further comprising:
a digital-to-analog conversion stage coupled to the modulator and configured to convert the samples of the complex baseband signal to analog form.

12. An apparatus in accordance with claim 11, further comprising:
a transmitter coupled to the digital-to-analog conversion stage.

13. The apparatus of claim 1 wherein the digital filter is further configured to generate one of a total of four different predetermined and fixed sequences of instantaneous digital frequency samples in response to each pulse.

14. The apparatus of claim 1 wherein the resolution of the frequency variation associated with the complex baseband signal includes 80 kHz and wherein the number of bits used to represent each generated instantaneous digital frequency sample includes three bits.

15. The apparatus of claim 1 wherein the resolution of the generated sequence of digital phase samples includes 3.6° and wherein the unit circle in the complex plane divided by the resolution of 3.6° yields 100 generated digital phase samples within the unit circle in the complex plane and wherein the number of bits used to represent each generated digital phase sample includes seven bits.

16. A method of performing digital communications, comprising:
receiving a pulsed input comprising a series of pulses;
processing the pulsed input as if the series of pulses is a series of impulses, processing the pulsed input comprising:
establishing a plurality of different predetermined and fixed sequences of instantaneous digital frequency samples representative of a predetermined type of filtering of the series of impulses, wherein a number of bits used to represent each instantaneous digital frequency sample is selected based upon a resolution of a frequency variation associated with a complex baseband signal; and
generating one of the plurality of predetermined and fixed sequences of instantaneous digital frequency samples in response to each pulse;
integrating the generated instantaneous digital frequency samples to generate a sequence of digital phase samples, wherein a number of bits used to represent each generated digital phase sample is selected based upon a unit circle in a complex plane divided by a resolution of the generated sequence of digital phase samples; and
generating digital samples of the complex baseband signal in response to each generated digital phase sample.

17. A method in accordance with claim 16, wherein the predetermined type of filtering of the series of impulses comprises a Gaussian shaped filtering function.

18. A method in accordance with claim 16, wherein the predetermined type of filtering of the series of impulses comprises all impulse response that is restricted to one symbol in length.

19. A method in accordance with claim 16, wherein each sequence of instantaneous frequency samples includes a total of eight (8) instantaneous frequency samples.

20. A method in accordance with claim 16, wherein each sequence of instantaneous frequency samples includes a total of ten (10) instantaneous frequency samples.

21. A method in accordance with claim 16, wherein the step of generating samples of a complex baseband signal comprises generating sine and cosine samples of the complex baseband signal.

22. A method in accordance with claim 16, wherein the step of generating samples of a complex baseband signal comprises a step of storing in a read only memory (ROM) only a portion of a total number of needed cosine samples.

23. A method in accordance with claim 22, wherein the step of generating samples of a complex baseband signal further comprises a step of translating a phase sample into an address that identifies a stored cosine sample having a magnitude equal to a needed cosine or sine sample that is not stored in the ROM.

24. A method in accordance with claim 23, wherein the step of generating samples of a complex baseband signal further comprises a step of performing an operation on the stored cosine sample to reflect a sign of the needed cosine or sine sample.

25. A method in accordance with claim 16, further comprising generating the pulsed input to represent digital data to be transmitted.

26. A method in accordance with claim 16, further comprising converting the samples of the complex baseband signal to analog form.

27. A method in accordance with claim 26, further comprising transmitting the analog form of the samples of the complex baseband signal.

28. The method of claim 16 wherein the plurality of different predetermined and fixed sequences of instantaneous digital frequency samples includes a total of four different predetermined and fixed sequences of instantaneous digital frequency samples.

29. The method of claim 16 wherein the resolution of the frequency variation associated with the complex baseband signal includes 80 kHz and wherein the number of bits used to represent each generated instantaneous digital frequency sample includes three bits.

30. The method of claim 16 wherein the resolution of the generated sequence of digital phase samples includes 3.60 and wherein the unit circle in the complex plane divided by the resolution of 3.6° yields 100 generated digital phase samples within the unit circle in the complex plane and wherein the number of bits used to represent each generated digital phase sample includes seven bits.

31. An apparatus for performing digital communications, comprising:
 means for receiving a pulsed input comprising a series of pulses;
 means for processing the pulsed input as if the series of pulses is a series of impulses, the means for processing the pulsed input comprising:
  means for establishing a plurality of different predetermined and fixed sequences of instantaneous digital frequency samples representative of a predetermined type of filtering of the series of impulses, wherein a number of bits used to represent each instantaneous digital frequency sample is selected based upon a resolution of a frequency variation associated with a complex baseband signal; and
  means for generating one of the plurality of predetermined and fixed sequences of instantaneous digital frequency samples in response to each pulse;
 means for integrating the generated instantaneous digital frequency samples to generate a sequence of digital phase samples, wherein a number of bits used to represent each generated digital phase sample is selected based upon a unit circle in a complex plane divided by a resolution of the generated sequence of digital phase samples; and
 means for generating digital samples of the complex baseband signal in response to each generated digital phase sample.

32. The apparatus in accordance with claim 31, wherein each sequence of instantaneous frequency samples includes a total of eight (8) instantaneous frequency samples.

33. The apparatus in accordance with claim 31, wherein the predetermined type of filtering of the series of impulses comprises a Gaussian shaped filtering function.

34. The apparatus in accordance with claim 31, wherein each sequence of instantaneous frequency samples includes a total of ten (10) instantaneous frequency samples.

35. The apparatus in accordance with claim 31, wherein the means for generating samples of a complex baseband signal comprises generating sine and cosine samples of the complex baseband signal.

36. The apparatus in accordance with claim 31, wherein the means for generating samples of a complex baseband signal further comprises means for storing in a read only memory (ROM) only a portion of a total number of needed cosine samples.

37. The apparatus in accordance with claim 36, wherein the means for generating samples of a complex baseband signal further comprises means for translating a phase sample into an address that identifies a stored cosine sample having a magnitude equal to a needed cosine or sine sample that is not stored in the ROM.

38. The apparatus in accordance with claim 37, wherein the means for generating samples of a complex baseband signal farther comprises means for performing an operation on the stored cosine sample to reflect a sign of the needed cosine or sine sample.

39. The apparatus in accordance with claim 31, further comprising means for generating the pulsed input to represent digital data to be transmitted.

40. The apparatus in accordance with claim 31, further comprising means for converting the samples of the complex baseband signal to analog form.

41. The apparatus in accordance with claim 40, further comprising means for transmitting the analog form of the samples of the complex baseband signal.

42. The apparatus in accordance with claim 31, wherein the predetermined type of filtering of the series of impulses comprises an impulse response that is restricted to one symbol in length.

43. The apparatus in accordance with claim 31, wherein the plurality of different predetermined and fixed sequences of instantaneous digital frequency samples includes a total of four different predetermined and fixed sequences of instantaneous digital frequency samples.

44. The apparatus in accordance with claim 31, wherein the resolution of the frequency variation associated with the complex baseband signal includes 80 kHz and wherein the number of bits used to represent each generated instantaneous digital frequency sample includes three bits.

45. The apparatus in accordance with claim 31, wherein the resolution of the generated sequence of digital phase samples includes 3.60° and wherein the unit circle in the complex plane divided by the resolution of 3.60° yields 100 generated digital phase samples within the unit circle in the complex plane and wherein the number of bits used to represent each generated digital phase sample includes seven bits.

46. A computer-readable medium including program code stored thereon, comprising:
 program code for receiving a pulsed input comprising a series of pulses;
 program code for processing the pulsed input as if the series of pulses is a series of impulses, the program code for processing further comprises:
  program code for establishing a plurality of different predetermined and fixed sequences of instantaneous digital frequency samples representative of a predetermined type of filtering of the series of impulses, wherein a number of bits used to represent each instantaneous digital frequency sample is selected based upon a resolution of a frequency variation associated with a complex baseband signal; and
  program code for generating one of the plurality of predetermined and fixed sequences of instantaneous digital frequency samples in response to each pulse;
  program code for integrating the generated instantaneous digital frequency samples to generate a sequence of digital phase samples, wherein a number of bits used to represent each generated digital phase sample is selected based upon a unit circle in a complex plane divided by a resolution of the generated sequence of digital phase samples; and
 program code for generating digital samples of the complex baseband signal in response to each generated digital phase sample.

47. The computer-readable medium in accordance with claim 46, wherein the program code for generating digital samples of the complex baseband signal further comprises program code for generating sine and cosine samples of the complex baseband signal.

48. The computer-readable medium in accordance with claim 46, wherein the program code for generating digital samples of the complex baseband signal further comprises program code for storing in a read only memory (ROM) only a portion of a total number of needed cosine samples.

49. The computer-readable medium in accordance with claim 48, wherein the program code for generating digital samples of the complex baseband signal further comprises program code for translating a phase sample into an address that identifies a stored cosine sample having a magnitude equal to a needed cosine or sine sample that is not stored in the ROM.

50. The computer-readable medium in accordance with claim 49, wherein the program code for generating digital samples of the complex baseband signal further comprises program code for performing an operation on the stored cosine sample to reflect a sign of the needed cosine or sine sample.

51. The computer-readable medium in accordance with claim 46, further comprising program code for generating the pulsed input to represent digital data to be transmitted.

52. The computer-readable medium in accordance with claim 46, further comprising program code for converting the digital samples of the complex baseband signal to analog form.

53. The computer-readable medium in accordance with claim 52, further comprising program code for transmitting the analog form of the complex baseband signal.

* * * * *